United States Patent
Bellis, Jr.

(10) Patent No.: US 7,849,557 B1
(45) Date of Patent: Dec. 14, 2010

(54) BACKPACK BLOWER RACK

(76) Inventor: William B. Bellis, Jr., 1401 Schuff La., Louisville, KY (US) 40205

( * ) Notice: Subject to any disclaimer, the term of this patent is extended or adjusted under 35 U.S.C. 154(b) by 952 days.

(21) Appl. No.: 11/682,618

(22) Filed: Mar. 6, 2007

(51) Int. Cl.
*A47L 5/00* (2006.01)

(52) U.S. Cl. ..................... 15/327.5; 15/327.2

(58) Field of Classification Search ............... 15/327.5, 15/327.2; 211/85.5–85.8, 23, 207, 94.01, 211/70.6, 204, 205, 89.01; 248/448, 449, 248/451, 302, 503, 690, 692, 423

See application file for complete search history.

(56) References Cited

U.S. PATENT DOCUMENTS

| 3,958,786 | A | * | 5/1976 | Mann ..................... 248/176.3 |
| 5,964,358 | A | | 10/1999 | Hafendorfer et al. |
| 6,053,339 | A | | 4/2000 | Bellis, Jr. |
| 6,281,417 | B1 | * | 8/2001 | Ladao ......................... 84/327 |
| 6,302,280 | B1 | | 10/2001 | Bermes |
| 6,311,853 | B1 | * | 11/2001 | Johnson ..................... 211/70.6 |
| 6,536,610 | B1 | | 3/2003 | Taylor |
| 6,648,152 | B2 | * | 11/2003 | Bermes ...................... 211/70.6 |
| 6,772,981 | B1 | * | 8/2004 | Yu ............................ 248/122.1 |

* cited by examiner

*Primary Examiner*—Dung Van Nguyen
(74) *Attorney, Agent, or Firm*—Theresa Fritz Camoriano; Camoriano and Associates

(57) ABSTRACT

A backpack blower rack for supporting and securing a backpack blower.

7 Claims, 5 Drawing Sheets

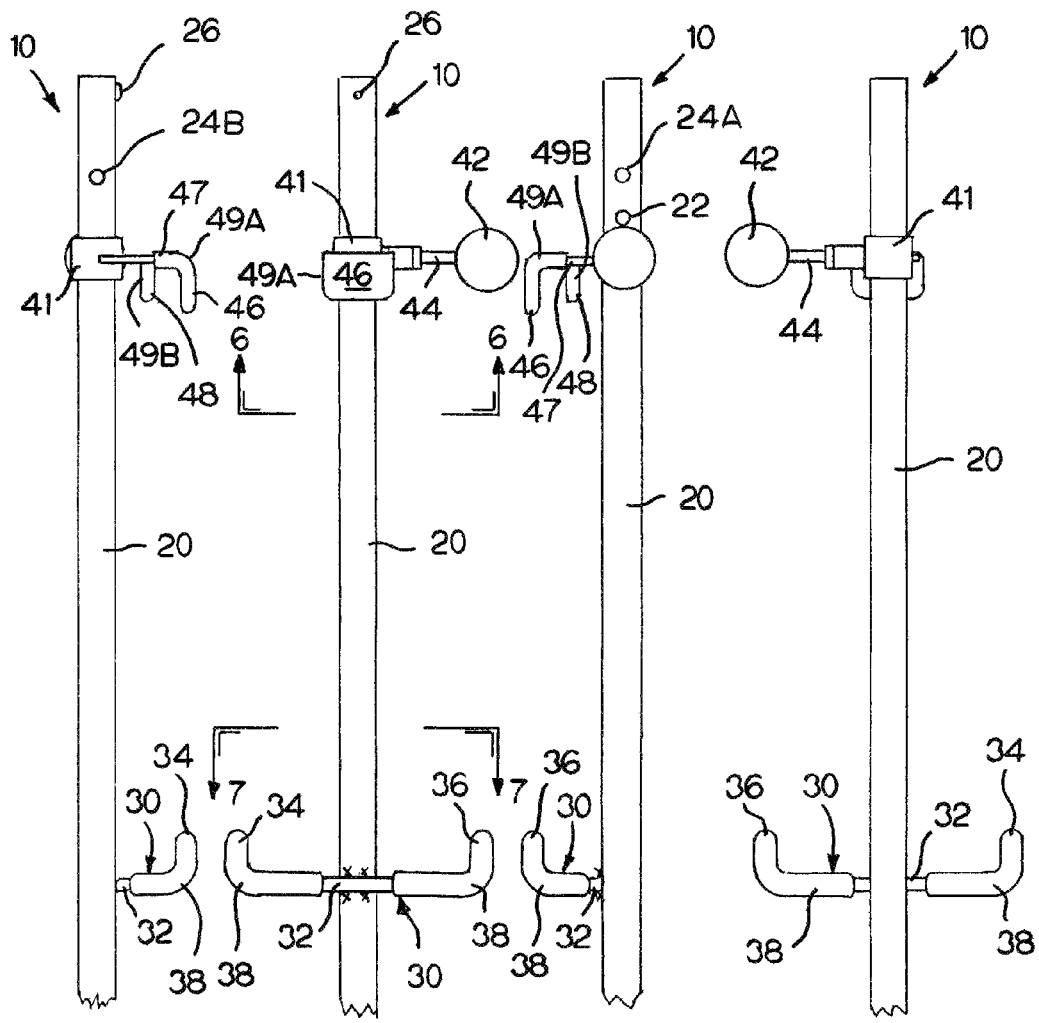
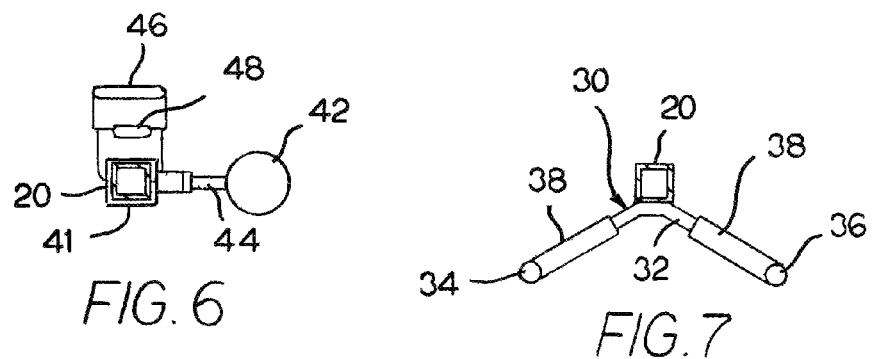
FIG.2 FIG.3 FIG.4 FIG.5
FIG.6 FIG.7

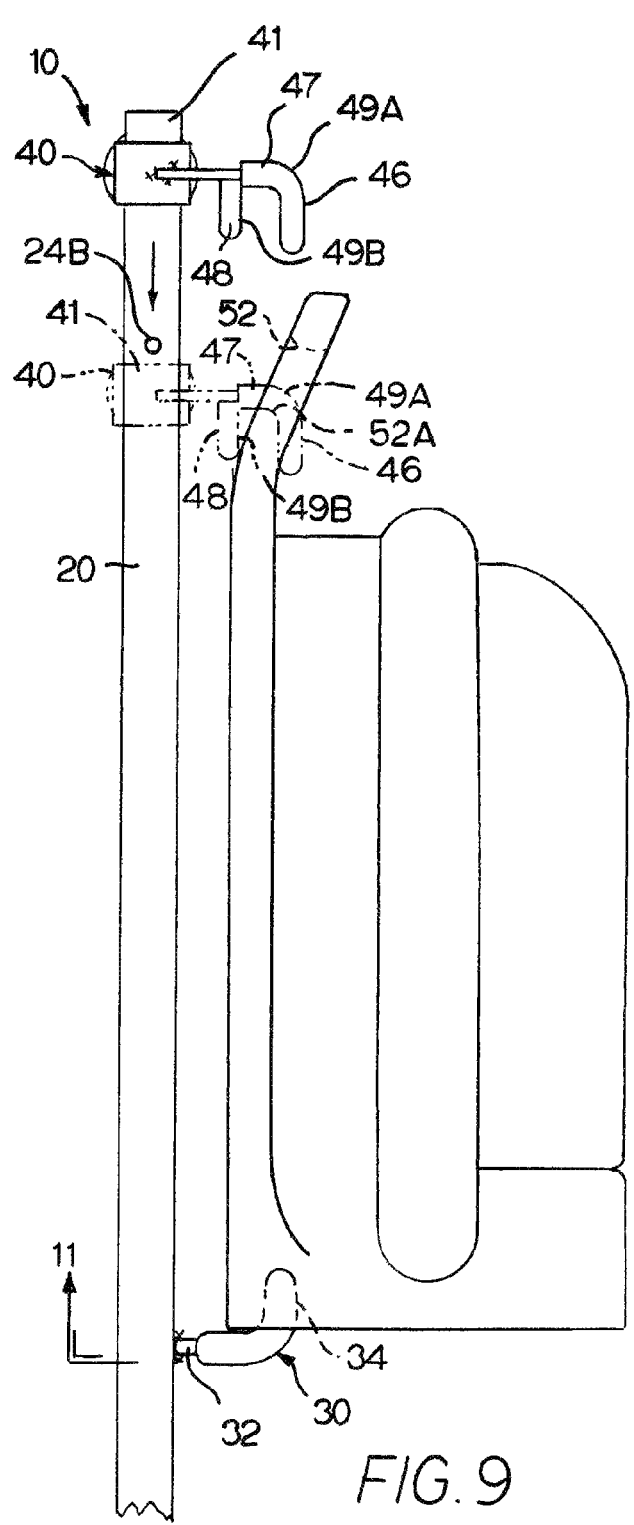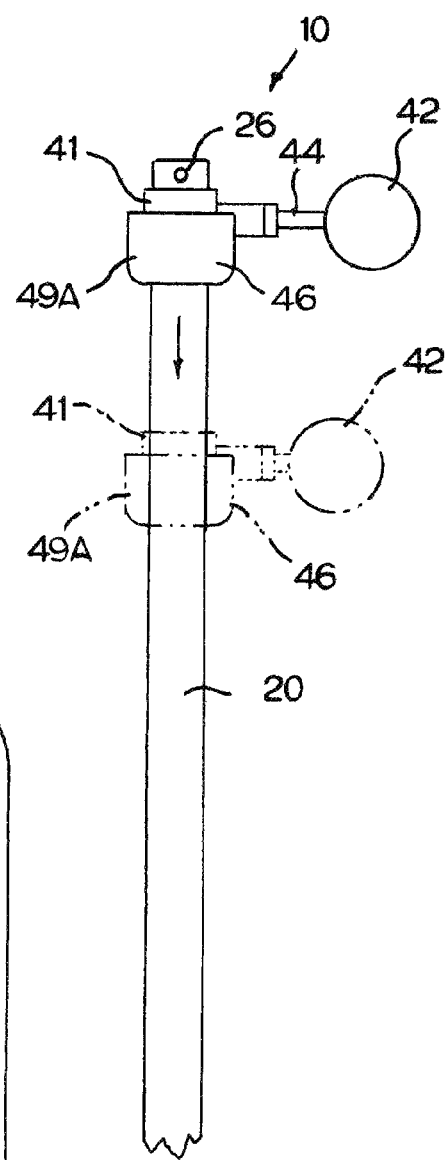
FIG. 9
FIG. 10

BACKPACK BLOWER RACK

BACKGROUND

The present invention relates to a rack for mounting a backpack blower.

BRIEF DESCRIPTION OF THE DRAWINGS

FIG. 2 is a broken-away left side view of the backpack blower rack shown in FIG. 1;

FIG. 3 is a broken-away front view of the backpack blower rack shown in FIG. 1;

FIG. 4 is broken-away right side view of the backpack blower rack shown in FIG. 1;

FIG. 5 is a broken-away rear view of the backpack blower rack shown in FIG. 1;

FIG. 6 is a view taken along line 6-6 of FIG. 3;

FIG. 7 is a view taken along line 7-7 of FIG. 3;

FIG. 9 is a broken away left side view, showing the backpack blower being secured to the backpack blower rack of FIG. 1;

FIG. 10 is a broken away front view of the backpack blower rack of FIG. 1, showing the movement of the upper support;

DETAILED DESCRIPTION

Figure 1:
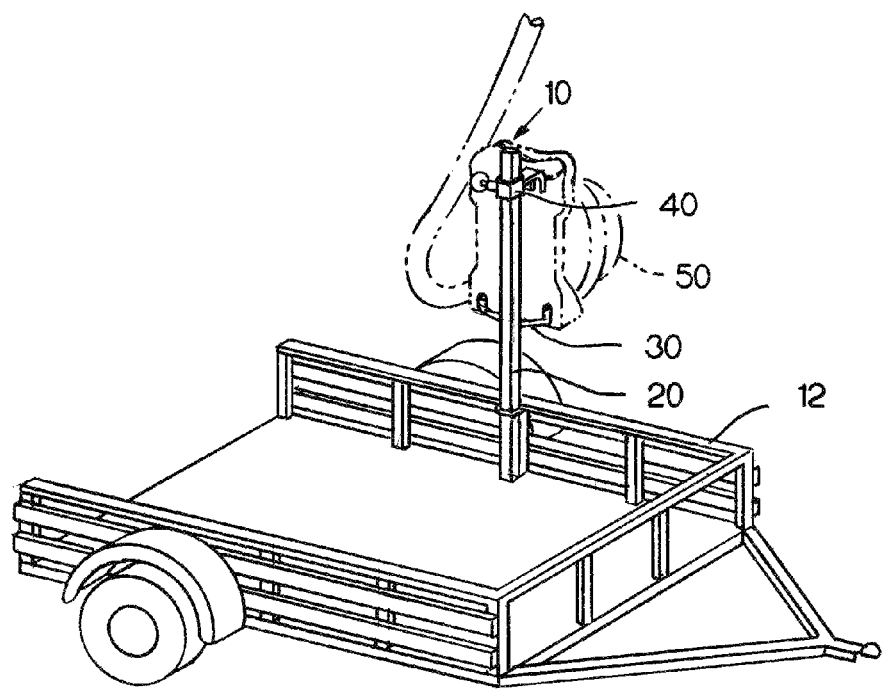
FIG. 1 is a rear perspective view of a backpack blower rack made in accordance with the present invention and mounted on a trailer.

FIGS. 1-13 show one embodiment of a backpack blower rack 10 made in accordance with the present invention. The basic components of the backpack blower rack 10 include an upright post 20, a lower support 30 welded onto the post 20, and an upper support 40 slidably mounted on the post 20. The backpack blower rack 10 allows a backpack blower 50 to be quickly and easily secured for storage and/or transport. The blower 50 then can be quickly and easily removed when needed.

FIG. 1 is a view of the backpack blower rack 10 mounted to a trailer 12. The backpack blower rack 10 is secured to the trailer by bolting the post 20 to the trailer in a manner similar to that shown and described in U.S. Pat. No. 6,053,339, which is hereby incorporated herein by reference. As shown in FIG. 1. a backpack blower 50 is mounted on the backpack blower rack 10. Of course, the backpack blower rack 10 alternatively could be secured to other structures, using appropriate mounting hardware.

The lower support 30 includes a base 32 which supports left and right parallel, upwardly projecting fingers 34, 36, which are spaced apart, forward of the post 20. In this embodiment, plastic sleeves 38 cover each of the fingers 34, 36, with the plastic sleeves 38 also covering portions of the base 32. The plastic sleeves 38 provide cushioning between the lower support 30 and the blower 50. As shown in FIG. 7, the base 32 of the lower support 30 is made up of left and right horizontal legs which meet at an angle of approximately 120 degrees.

Figure 11:
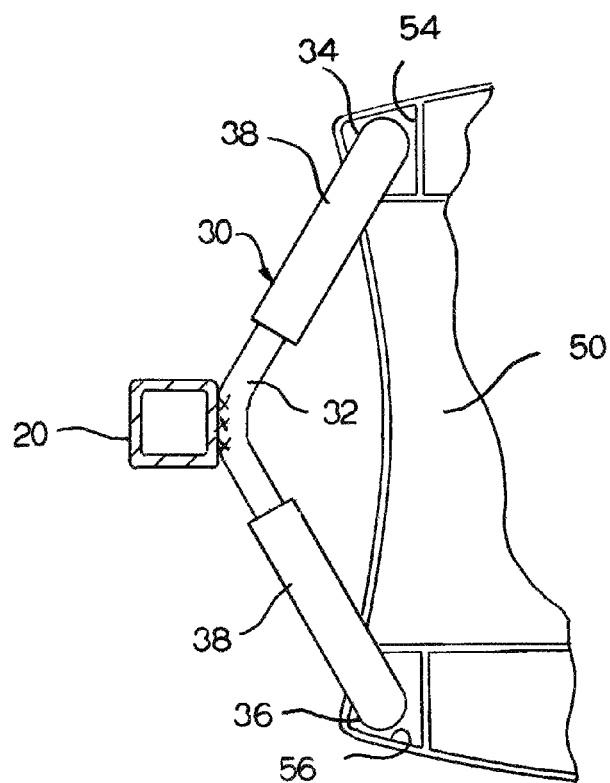
FIG. 11 is a view taken along line 11-11 of FIG. 9.

As shown in FIG. 11, the backpack blower 50 defines left and right upwardly-directed recesses 54, 56 in its bottom surface. These recesses 54, 56 receive the left and right upwardly-projecting fingers 34, 36 of the lower support 30, which fixes the bottom of the backpack blower 50 relative to the post 20. The backpack blower 50 rests on top of the lower support 30, as shown in FIG. 9, and the left and right projections 34, 36 fit inside the recesses 54, 56.

Figure 8:
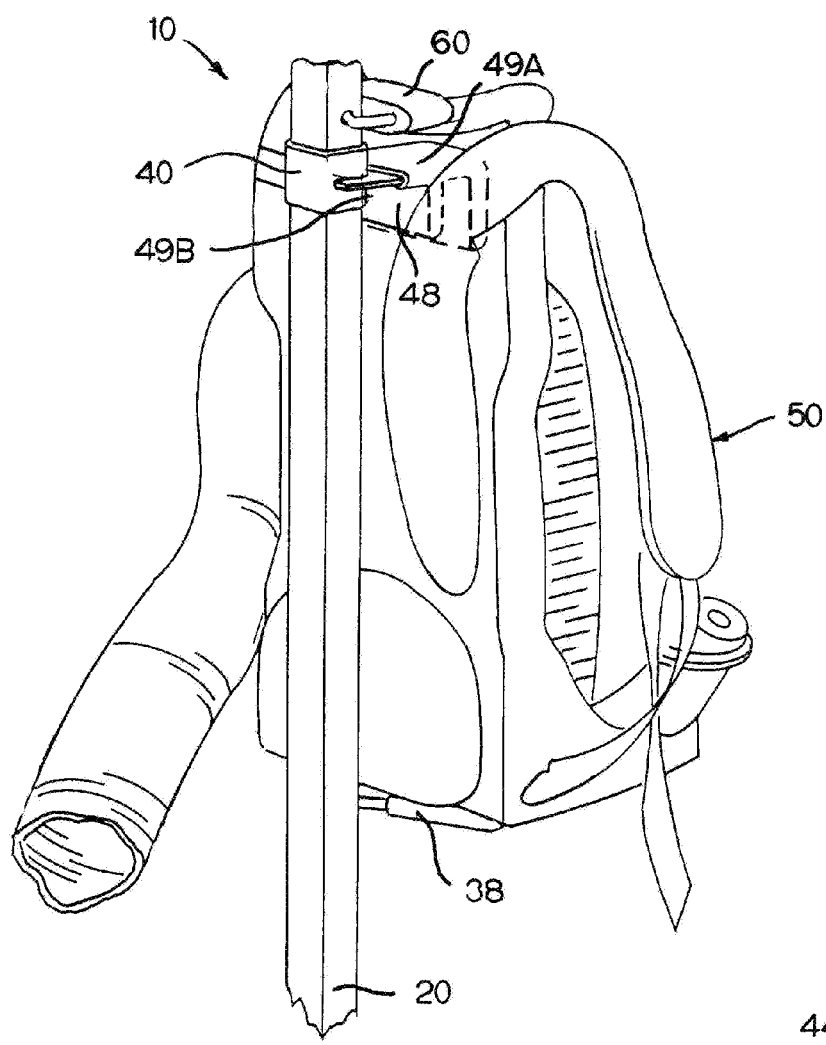
FIG. 8 is a broken away rear perspective view, showing a backpack blower mounted on the rack of FIG. 1.
Figure 13:
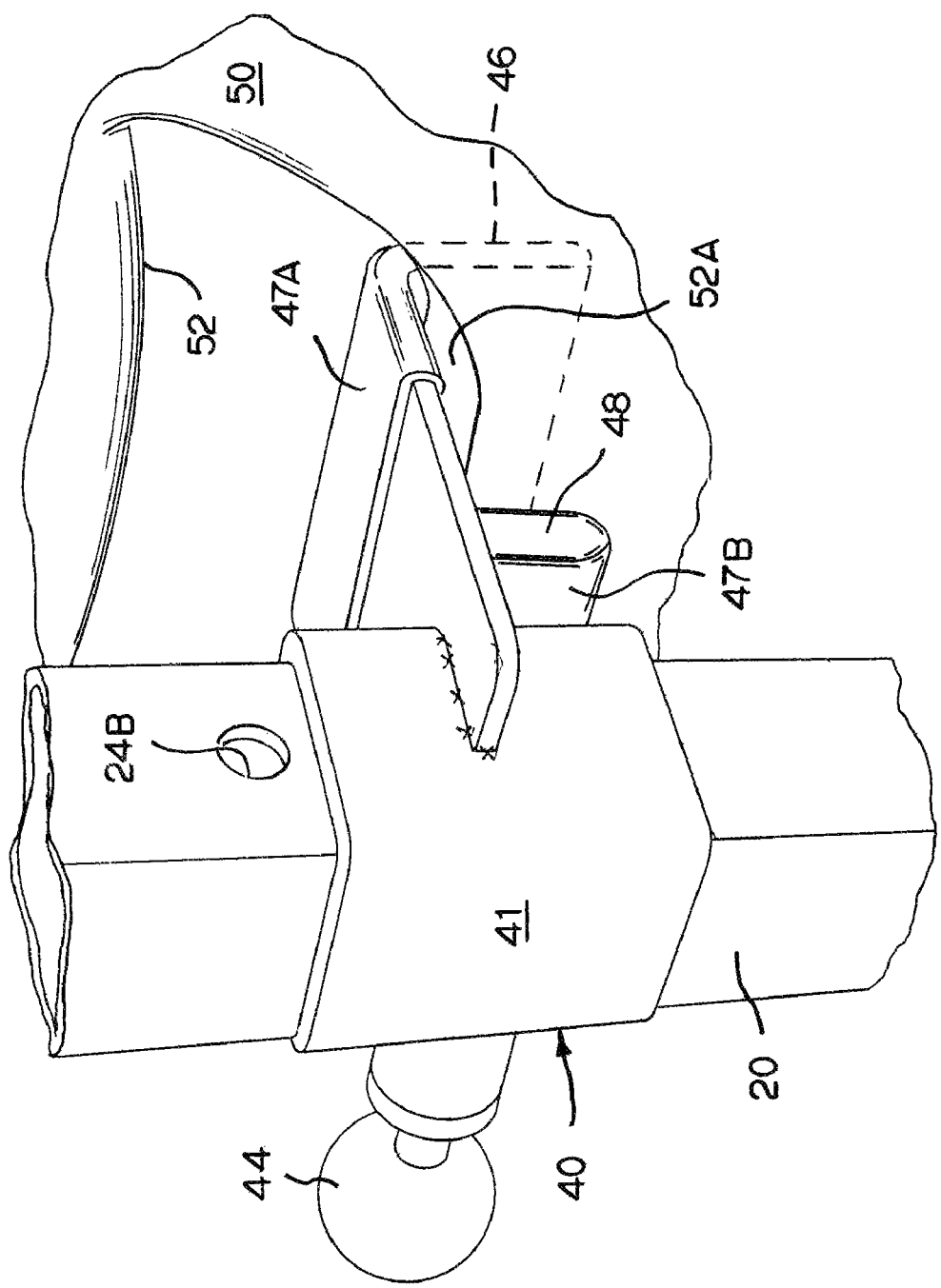
FIG. 13 is a broken away perspective view, showing the upper support of FIG. 10 engaged with the backpack blower.

The upper support 40 includes an engagement means for engaging the upper part of the blower and is used to secure the top of the blower 50 relative to the upright post 20. It includes an inverted U-shaped member having forward and rear downwardly-projecting legs 46, 48 and a connector leg 47 extending between the forward and rear legs 46, 48. As shown in FIGS. 8, 9, and 13, the frame of the backpack blower 50 defines an upper opening 52, and the upper support 40 engages with the frame at that upper opening 52. The forward leg 46 extends downwardly in front of the frame at the opening 52, while the rear leg 48 extends downwardly, parallel to the forward leg 46, and engages the rear side of the frame of the backpack blower 50. The connector leg 47 lies just above the surface 52A at the bottom of the opening 52.

The inverted U-shaped member on the upper support 40 lies directly above the upwardly-projecting fingers 34, 36 of the lower support 30. With the upwardly-projecting fingers 34, 36 of the lower support received in the recesses 54, 56 in the bottom surface of the blower 50, and the upper support 40 secured at the opening 52 in the backpack blower frame, the backpack blower 50 is secured in place in an upright position on the upright post 20.

In this embodiment, the legs 46, 47, 48 are metal and are covered with plastic sleeves 49A, 49B for cushioning.

The upper support 40 includes a square cross-section sleeve 41 that surrounds the square cross-section upright post 20 with a close, sliding fit, allowing the upper support 40 to slide up and down along the upright post 20. Near the top of the upright post 20 is a mounting hole 22 through the right side of the upright post 20, as shown best in FIG. 4. Just above the mounting hole 22 is a locking hole 24A on the right side of the post 20, which is aligned with a locking hole 24B on the left side of the post 20 (see FIG. 2). The locking holes 24A, 24B are intended to receive a padlock 60 or a similar device, as shown in FIG. 8, to prevent the upper support 40 from sliding upwardly to release the backpack blower 50.

Figure 12A:
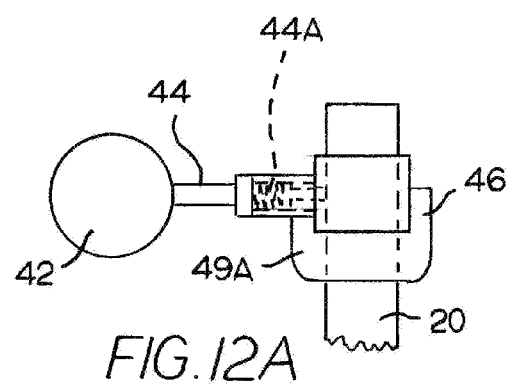
FIG. 12A is a broken away rear view of the upper support of FIG. 10 with the pin retracted.
Figure 12B:
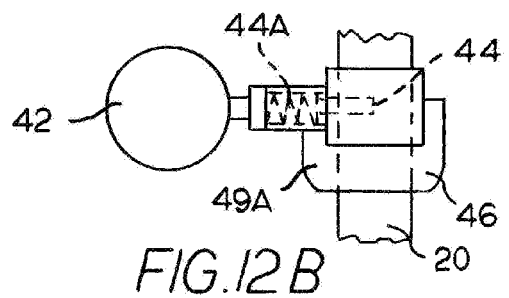
FIG. 12B is the same view as FIG. 12A but with the pin extended.

As best shown in FIGS. 12A and 12B, the upper support 40 includes a knob 42 secured to the end of a pin 44 and a spring 44A that biases the pin 44 inwardly, into the upright post 20. When the pin 44 extends into the mounting hole 22, it prevents the upper support 40 from sliding up and down relative to the post 20. Pulling the knob 42 outwardly, as shown in FIG. 12A, until the pin 44 is out of the post 20, releases the upper support 40, so it can slide up and down along the post 20.

The mounting hole 22 is positioned on the upright post 20 a selected distance from the lower support 30 so the upper support 40 can be fixed relative to the post 20 when it is clamping down on the top of the blower 50 and when the upwardly projecting fingers 34, 36 of the lower support 30 are received in the recesses 54, 56. The upright post 20 could have a plurality of mounting holes at various elevations to provide a range of positions for the upper support 40, if desired.

Near the top of the upright post 20, a self tapping screw 26 is screwed into the front of the post 20 to serve as a stop, preventing the upper support 40 from sliding off the top of the post 20.

To mount a backpack blower 50 on the rack 10, the bottom of the blower 50 is angled toward the lower support 30, and the recesses 54, 56 in the bottom surface of the blower 50 are aligned with the upwardly projecting fingers 34, 36. The blower 50 is then lowered until the fingers 34, 36 are received in the recesses 54, 56 and the blower 50 is resting on the base 32 of the lower support 30. Then the user pulls out the knob 42 to disengage the pin 44 of the upper support 40 from the mounting hole 22, and slides the upper support 40 down so that the forward leg 46 extends in front of the blower frame, the rear leg 48 extends in back of the blower frame, and the connector leg 47 extends along the top surface 52A of the opening in the frame, as shown in FIGS. 9 and 13. When the pin 44 of the upper support 40 aligns with the mounting hole 22, the spring 44A causes the pin 44 to extend through the hole 22, as shown in FIG. 12B, thereby fixing the upper support 40 in position relative to the post 20. Finally, a padlock 60 or other locking device may be inserted through the locking holes 24A, 24B for security (see FIG. 8). To remove the blower 50, the reverse procedure is used.

It will be obvious to those skilled in the art that modifications may be made to the embodiment described above without departing from the scope of the invention as claimed.

What is claimed is:

1. A backpack blower rack, comprising:
    an upright post having a top, bottom, front side, rear side, left side, and right side;
    a lower support fixed to the upright post and including a base supporting left and right parallel upwardly projecting fingers spaced forward of said post;
    an upper support slidably mounted on said post for movement up and down relative to said post, including an engagement means for engaging the upper part of a blower; and
    a backpack blower having a bottom surface defining left and right upwardly extending recesses which receive said left and right upwardly projecting fingers, respectively.

2. A backpack blower rack as recited in claim 1, wherein said engagement means includes a forward downwardly extending leg and a connector leg which extends to said forward downwardly extending leg, both of said legs being forward of said post, wherein said backpack blower defines an upper opening which receives the engagement means.

3. A backpack blower rack, comprising:
    an upright post having a top, bottom, front side, rear side, left side, and right side;
    a lower support fixed to the upright post and including a base supporting left and right parallel upwardly projecting fingers spaced forward of said post; and
    an upper support slidably mounted on said post for movement up and down relative to said post, including an engagement means for engaging the upper part of a blower, wherein said engagement means is an inverted U-shaped member forward of said post, including forward and rear downwardly extending legs and a connector leg extending between said forward and rear downwardly extending legs.

4. A backpack blower rack as recited in claim 3, wherein said upper support includes a spring-biased pin, and said upright post defines a hole that receives said spring-biased pin to fix the position of said upper support on said post.

5. A backpack blower rack as recited in claim 4, wherein said inverted U-shaped member lies directly above said upwardly projecting fingers.

6. A backpack blower rack as recited in claim 5, and further comprising a backpack blower mounted on said rack, said blower having a bottom surface defining left and right upwardly extending recesses which receive said left and right upwardly projecting fingers, respectively, and said blower defining an upper opening which receives said inverted U-shaped member.

7. A backpack blower rack, comprising:
    an upright post having a top, bottom, front side, rear side, left side, and right side;
    a lower support fixed to the upright post and including a base supporting left and right parallel upwardly projecting fingers spaced forward of said post; and
    an upper support slidably mounted on said post for movement up and down relative to said post, including an engagement means for engaging the upper part of a blower, wherein said upper support includes a spring-biased pin, and said upright post defines a hole that receives said spring-biased pin to fix the position of said upper support on said post.

* * * * *